(12) United States Patent  
Ducreuzot

(10) Patent No.: US 8,322,675 B2
(45) Date of Patent: Dec. 4, 2012

(54) VEHICLE SEAT, MANUFACTURING PROCESS FOR SUCH A VEHICLE SEAT, AND MACHINE FOR IMPLEMENTING THE MANUFACTURING PROCESS

(75) Inventor: Philippe Ducreuzot, Nogent-sur-Vernisson (FR)

(73) Assignee: Faurecia Sièges d'Automobile, Nanterre (FR)

( * ) Notice: Subject to any disclaimer, the term of this patent is extended or adjusted under 35 U.S.C. 154(b) by 350 days.

(21) Appl. No.: 12/709,579

(22) Filed: Feb. 22, 2010

(65) Prior Publication Data

US 2010/0219319 A1 Sep. 2, 2010

(30) Foreign Application Priority Data

Feb. 20, 2009 (FR) ..................................... 09 51123

(51) Int. Cl.
*F16M 13/00* (2006.01)
(52) U.S. Cl. ........ 248/424; 248/429; 403/278; 403/280; 411/43
(58) Field of Classification Search .................. 248/424, 248/429; 403/278, 279, 280, 282; 29/520; 411/43, 501, 508
See application file for complete search history.

(56) References Cited

U.S. PATENT DOCUMENTS

| 4,177,545 | A | * | 12/1979 | Lambertz | 29/11 |
| 5,365,654 | A | * | 11/1994 | Moulton | 29/761 |
| 6,527,490 | B1 | * | 3/2003 | Donhauser | 411/455 |
| 6,749,169 | B2 | | 6/2004 | Becker et al. | |
| 7,303,366 | B2 | * | 12/2007 | Smith | 411/43 |
| 2001/0046411 | A1 | * | 11/2001 | Olsson et al. | 403/281 |

FOREIGN PATENT DOCUMENTS

| DE | 101 13 153 C1 | 4/2002 |
| DE | 101 47 800 A1 | 3/2003 |
| DE | 298 24 882 U1 | 3/2003 |
| FR | 2 847 862 A | 6/2004 |

* cited by examiner

*Primary Examiner* — Amy J. Sterling
(74) *Attorney, Agent, or Firm* — Miller, Matthias & Hull LLP

(57) ABSTRACT

A seat comprising a seat part and a height adjustment mechanism comprising a link having a bore which comprises at least one substantially radial notch, a revolving tube having a fitting portion placed in the bore, said tube externally comprising two axial stops in contact with the link on either sides, at least one of said axial stops consisting of a bead having a stop surface in contact with the link, and a support surface opposite from the stop surface, the fitting portion externally comprising at least one bulge extending into the notch, wherein the bead comprises at least one axial indentation in the support surface, facing the notch, said indentation being adjacent to the bulge.

5 Claims, 6 Drawing Sheets

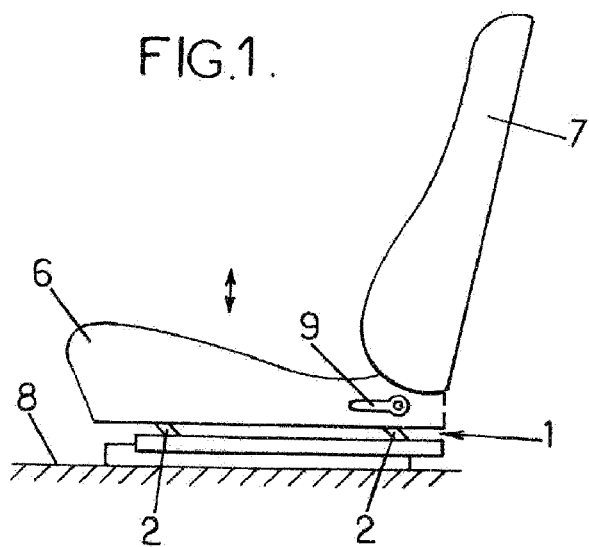
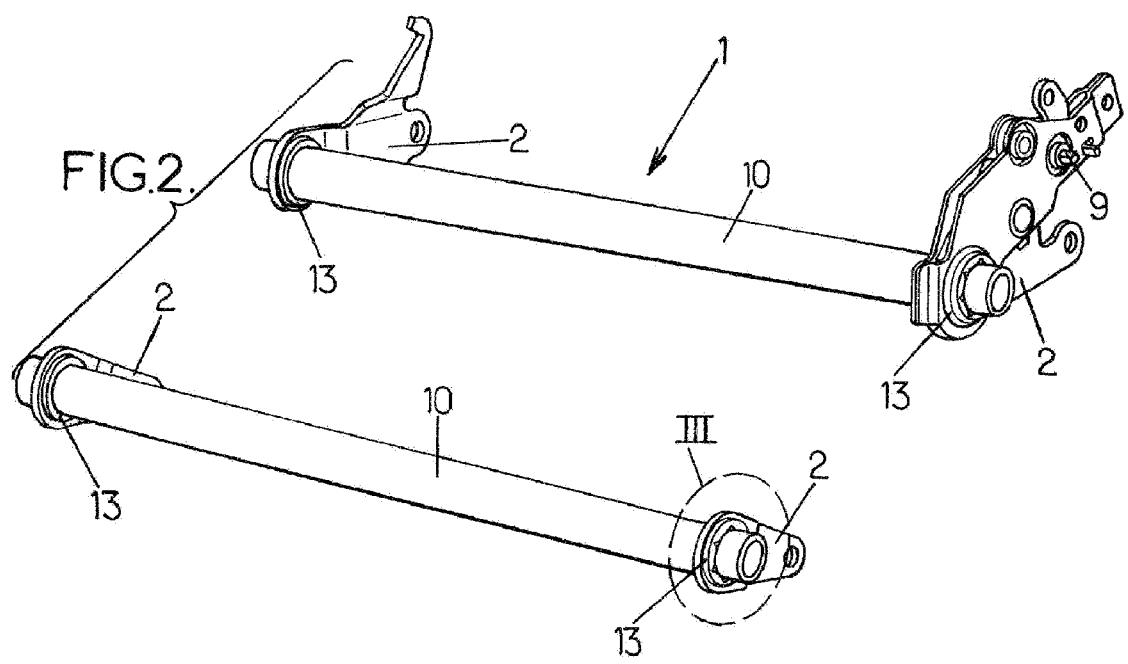

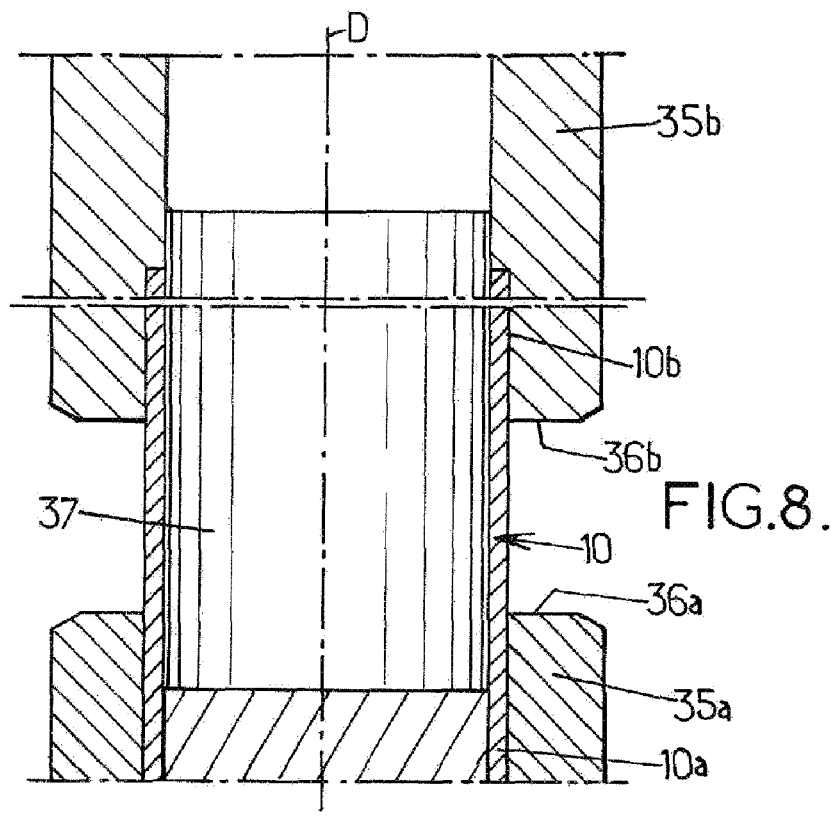

VEHICLE SEAT, MANUFACTURING PROCESS FOR SUCH A VEHICLE SEAT, AND MACHINE FOR IMPLEMENTING THE MANUFACTURING PROCESS

CROSS REFERENCE TO RELATED APPLICATION

This application claims priority under the Paris Convertor to French Application No. 09 5412, filed on Feb. 20, 2009.

FIELD OF THE DISCLOSURE

The invention relates to a vehicle seat, a manufacturing process for such a vehicle seat, and a machine for implementing the manufacturing process.

BACKGROUND OF THE DISCLOSURE

In particular, the invention relates to a vehicle seat comprising a seat part equipped with a rigid frame, and a height adjustment mechanism comprising:
- at least one link intended to be pivotably mounted in relation to a vehicle floor, said link having two substantially parallel lateral surfaces, and a bore extending between said lateral surfaces, said bore being delimited by an internal cylindrical surface of a generally circular cross-section, along an axis substantially perpendicular to said lateral surfaces, with said bore comprising at least one substantially radial notch,
- a revolving tube pivotably mounted on the rigid frame, said tube extending along the axis and having a fitting portion placed in the bore, said tube externally comprising two axial stops which delimit between them the fitting portion and which are respectively in contact with the lateral surfaces of the link, at least one of said axial stops consisting of a radial deformation of the tube to form a bead, said bead having a stop surface and a support surface opposite the stop surface, said stop surface being in contact with one of the lateral surfaces, the fitting portion externally comprising at least one locally formed radial deformation facing the notch and forming a bulge, with said bulge extending into the notch.

A satisfactory seat of this type is known from document FR-A-2 772 317.

SUMMARY OF THE DISCLOSURE

The invention aims to improve in a simple manner the translational and rotational securing of the link and tube.

For this purpose, the invention proposes a seat of the type described above, wherein the bead comprises at least one axial indentation in the support surface, facing the notch, with said indentation being adjacent to the bulge.

Thus the indentation formed adjacent to the bulge increases the flow of the fitting portion of the tube into the notch. The amount of material in the notch, increased by the material of the bead at the indentation displaced along the axis of the tube, improves in a simple manner the translational and rotational securing of the link and tube.

In some arrangements, control of the flow can be improved by locally increasing the outward radial deformation forming the bulge. In particular, the stop surface and the support surface of the bead can be respectively connected to the tube by first and second folds, the bead extending out to a free edge, the indentation being formed in the second fold and at a distance from the free edge.

It can also be provided that the link comprises a number, greater than or equal to 2, of uniformly spaced notches, and the bead comprises a number, greater than or equal to 2, of uniformly spaced indentations. The number of indentations can then either be a sub-multiple of the number of notches, or equal to the number of notches, with one indentation provided facing each notch.

In a second aspect, the invention concerns a manufacturing process for a seat as defined above, comprising the following steps:
- providing a seat part equipped with a rigid frame,
- providing a link having two substantially parallel lateral surfaces, and a bore extending between said lateral surfaces, said bore being delimited by an internal cylindrical surface of a generally circular cross-section along an axis substantially perpendicular to said lateral surfaces, said bore comprising at least one substantially radial notch,
- providing a revolving tube externally comprising an axial stop,
- positioning the tube in the bore along the axis until the axial stop is in contact with one of the lateral surfaces of the link,
- deforming the tube radially outward to form a bead delimiting, with the axial stop, a fitting portion of the tube, said bead having a stop surface in contact with the other lateral surface of the link, and a support surface opposite from the stop surface,
- deforming the fitting portion radially outward and locally facing the notch to form at least one bulge extending into the notch,
- pivotably mounting the tube onto the rigid frame, wherein, in said process, during the step of deforming the fitting portion, the support surface of the bead is axially indented facing the notch to form at least one axial indentation in the support surface, with said indentation being adjacent to the bulge.

In some arrangements, to improve the control of the flow:
- during the step of deforming the tube, first and second folds are formed, respectively connecting the stop surface and the support surface of the bead to the tube, with the bead extending out to a free edge,
- during the step of deforming the fitting portion, the bead is indented in the second fold and at a distance from the free edge.

In one embodiment, to simplify the manufacturing process, during the steps consisting of deforming the tube and the fitting portion, first and second free portions of the tube situated on either sides of the fitting portion are held in place and the tube is compressed along the axis.

In a third aspect, the invention concerns a machine for implementing the manufacturing process defined above, comprising:
- a tool comprising a body equipped with a cylindrical housing along one axis and having an opening to the exterior, and with a radial end surface surrounding the opening, the housing being adapted to receive a free portion of a revolving tube, said free portion being located on one side of a fitting portion of the tube, said fitting portion being placed in a bore comprising at least one substantially radial notch,
- a holder for retaining another free portion of the tube, said other free portion being situated on the other side of the fitting portion of the tube,
- a guiding system in which the tool is mounted, the guiding system being adapted to move the tool towards the holder in a direction parallel to the axis of the housing, wherein the tool of said machine comprises at least one protrusion extending along the axis of the housing from the end surface, said protrusion being intended to be placed facing the notch.

In some embodiments, the machine can comprise one or more of the following arrangements:

the end surface has an inside edge in proximity to the axis, and an outside edge, the protrusion being arranged on the inside edge and at a distance from the outside edge, the tool comprises a number, greater than or equal to 2, of uniformly spaced protrusions, with the bore comprising a number, greater than or equal to 2, of uniformly spaced notches, the number of protrusions is a sub-multiple of the number of notches, the number of protrusions is equal to the number of notches.

BRIEF DESCRIPTION OF THE DRAWINGS

Other features and advantages of the invention will become apparent from reading the following description, made with reference to the attached drawings in which:

FIG. 1 is a schematic view of a vehicle seat comprising a seat part and a height adjustment mechanism, FIG. 2 is a partial perspective view of the height adjustment mechanism of the seat of FIG. 1.

DETAILED DESCRIPTION OF THE DISCLOSURE

Figure 3:
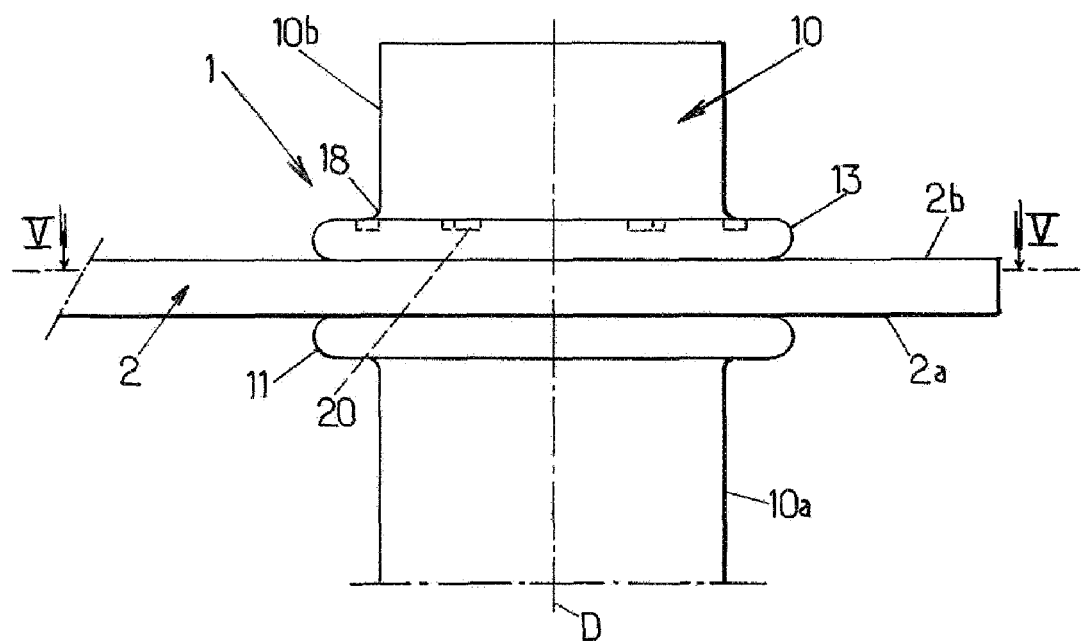
FIG. 3 is a detailed elevation view of the detail referenced III in FIG. 2 of the height adjustment mechanism.
Figure 4:
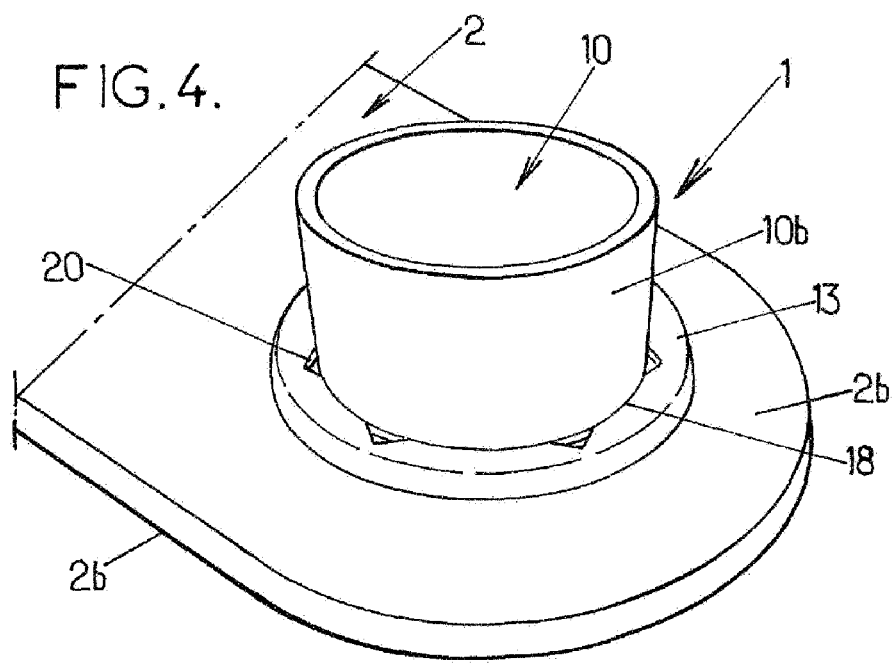
FIG. 4 is a perspective view of the detail in FIG. 3.

In the figures, the same reference numbers are used to designate identical or analogous elements.

FIG. 1 represents a vehicle seat comprising a seat part 6 and a backrest 7 supported by the seat part 6. The seat part 6, equipped with a rigid frame comprising for example two parallel metal flanges, is supported by a height adjustment mechanism 1 mounted, for example, on two longitudinal sliding rails fixed to a floor 8 of the vehicle.

The height adjustment mechanism 1 can comprise a control device 9 which controls the pivoting of metal links 2, each pivotably mounted between one of the sliding rails and one of the flanges of the seat part. In this manner, the pivoting of the links 2 is translated into a vertical upward or downward movement of the seat part 6.

As is represented in more detail in FIG. 2, in this particular embodiment, the links 2 are four in number and arranged in two pairs, front and rear respectively, with the two links 2 of each pair connected to each other by a transverse metal tube 10. Each link 2 is placed near an end of one of the tubes 10.

The invention is not limited to such a height adjustment mechanism, however, particularly concerning the number and arrangement of the links 2.

Each link 2 and the corresponding tube 10 are translationally and rotationally secured to each other as explained hereafter. In addition, each end of the tubes 10 is pivotably mounted onto one of the flanges of the seat part 6 to allow the tubes 10 to pivot during height adjustment of the seat part 6.

The control device 9 is connected to the rear tube 10 by means of a gear train of the type described in the document FR-A-2 896 195 in a manner that causes, due to the translational and rotational securing of the link 2 and the tube 10, the pivoting of the link 2 when the control device is activated.

The assembly of one of the ends of one of the tubes 10 to one of the links 2 is described in relation to FIGS. 3, 4, 5 and 6, it being understood that such an assembly can be implemented for one or more tube/link pairs.

Figure 5:
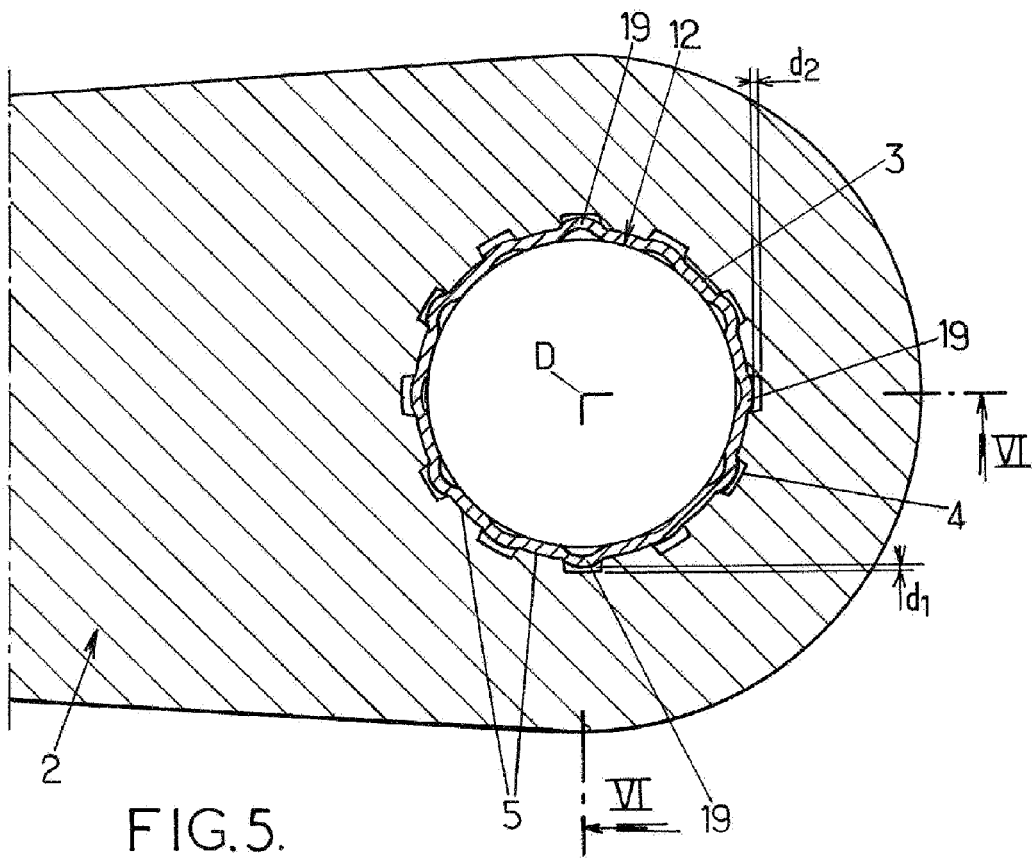
FIG. 5 is a cross-sectional view, in the direction referenced V-V in FIG. 3, of the detail represented in FIG. 3 of the height adjustment mechanism.
Figure 6:
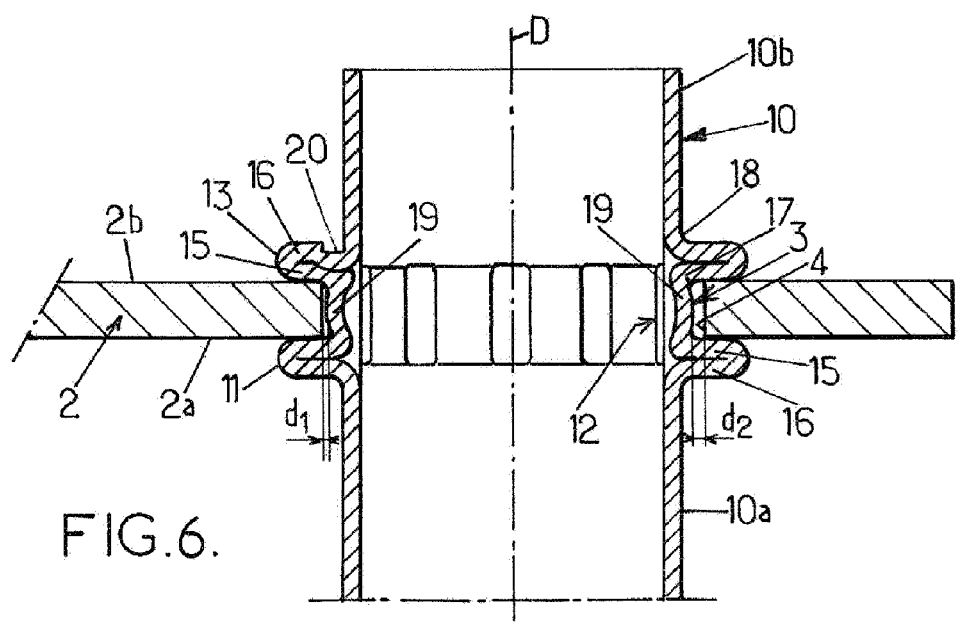
FIG. 6 is a cross-sectional view, in the direction referenced VI-VI in FIG. 5, of the detail represented in FIG. 3 of the height adjustment mechanism.

The link 2 has first 2a and second 2b substantially parallel lateral surfaces, and a bore 3, as can be seen in particular in FIGS. 5 and 6. The bore 3, delimited by an internal cylindrical surface of circular cross-section, extends between the first 2a and second 2b lateral surfaces along an axis D substantially perpendicular to the first 2a and second 2b lateral surfaces.

The revolving tube 10 extends along an axis and has a fitting portion 12, as can be seen in particular in FIG. 6, placed in the bore 3 coaxially to the axis D. The tube 10 also has first 10a and second 10b free portions located on each side of the fitting portion 12 and respectively extending to the first and second ends.

To ensure the translational securing of the tube 10 to the link 2 along the axis D, the tube 10 comprises externally a first 11 and second 13 axial stops which extend out radially relative to the axis of the tube, spaced apart from each other along the axis of the tube. The first 11 and second 13 axial stops delimit between them the fitting portion 12 and respectively have stop surfaces in contact with the first 2a and second 2b lateral surfaces of the link 2. For each of the first 11 and second 13 axial stops, a support surface is defined opposite from the stop surface.

In the embodiment represented, as can be seen in FIG. 6, the first 11 and second 13 axial stops are annular and each consists of a radial deformation of the tube 10 to form a bead.

Each of the first 11 and second 13 beads comprises a first 15 and second 16 annular tube portion, radial to the axis of the tube and folded against each other. The first portion 15 which bears the stop surface is connected to the fitting portion 12 by a first fold 17. The second portion 16 which bears the support surface is connected to the corresponding free portion 10a, 10b of the tube by a second fold 18. Opposite the first 17 and second 18 folds, the first 15 and second 16 tube portions are connected by a fold forming a free edge for each of the first 11 and second 13 beads.

In a variation, only one of the first 11 and second 13 axial stops could consist of a bead. The other stop can then have any other appropriate form, whether annular or otherwise, for example a shoulder or one or more protrusions, and be formed on the tube 10 or from a separate element fixed to the tube 10.

As is shown in FIG. 5, to ensure the rotational securing of the tube 10 to the link 2 around the axis D, the bore 3 comprises a plurality of substantially radial notches 4. In FIG. 5, the notches 4, for example of a substantially trapezoidal shape, are twelve in number and are uniformly spaced. The internal surface of the bore 3 then has an indentation in which two adjacent sections, one of them forming a contact section 5 and the other a bottom for one of the notches 4, are radially staggered relative to the axis D.

The fitting portion 12 is radially deformed such that a part of the material of the tube 10 penetrates into the notches 4. In particular, the fitting portion 12 externally comprises a locally formed radial deformation facing each notch 4 and forming a bulge 19 extending into the notch 2. Between two bulges, the fitting portion 12 can come in contact with the contact sections 5 of the internal surface of the bore 3.

To increase the amount of material in at least some of the notches 4, the second bead 13 comprises axial indentations 20 in the support surface, facing certain notches 4. In the embodiment represented in FIGS. 3, 4 and 6, the second bead 13 comprises an indentation 20 every two notches 4, which is six uniformly spaced indentations 20.

In FIG. 6, each indentation 20 made adjacent to one of the bulges 19 is formed in the second fold 18 and at a distance from the free edge of the second bead 13. In particular, each indentation 20 has a generally triangular shape with a base placed at the second fold 18. At each indentation 20, the second portion 16 has a sunk relief in the support surface which, due to the contact with the first portion 15, increases the amount of material in the fitting portion 12 and, in particular, in the corresponding bulge 19.

For example, in FIGS. 5 and 6, due to the addition of material originating from the indentations 20, there is greater penetration into the notches 4 of the bulges 19 adjacent to the indentations 20. Thus, the bulge 19 adjacent to the indentation 20 (to the left in FIG. 6) extends, at least in proximity to the second bead 13, into the notch 4 to a distance d1, measured radially, from the bottom of the notch 4. The bulge 19 with no adjacent indentation 20 (to the right in FIG. 6) extends into the notch 4 to a distance d2, measured radially, from the bottom of the notch 4, with the distance d2 being greater than the distance d1.

Indentations 20 as described above could be realized in the first bead 11, by replacing or supplementing the indentations 20 realized in the second bead 13.

The invention is not limited to the shape, numbers, and placements of the notches and indentations 20 described above. For example, the number of indentations 20 can be another sub-multiple of the number of notches 4 than the one previously described, in particular by having an indentation 20 every three notches 4. There can also be an indentation 20 for each notch 4, an irregular allocation of notches 4 and indentations 20, or a single notch 4 and a single indentation 20.

For example, the invention has been implemented in an assembly with the tube 10 and the link 2 comprising thirteen notches 4 of a circular profile with a radius of 3 mm to 4 mm. Without the indentations, the assembly would offer a friction torque of approximately 300 N·m. The creation of six indentations facing six of the notches increased the torque by 10% to 20%.

In another exemplary implementation, the link 2 can comprise a smaller number of notches 4, for example ten, eight, or four, with the tube 10 comprising ten, eight, or four indentations 20, one indentation 20 per notch 4. By adapting the profile of the notches 4, for example providing polygonal notches 3 mm to 7 mm deep and 8 mm to 12 mm wide, it is possible to improve the friction torque further.

Figure 7:
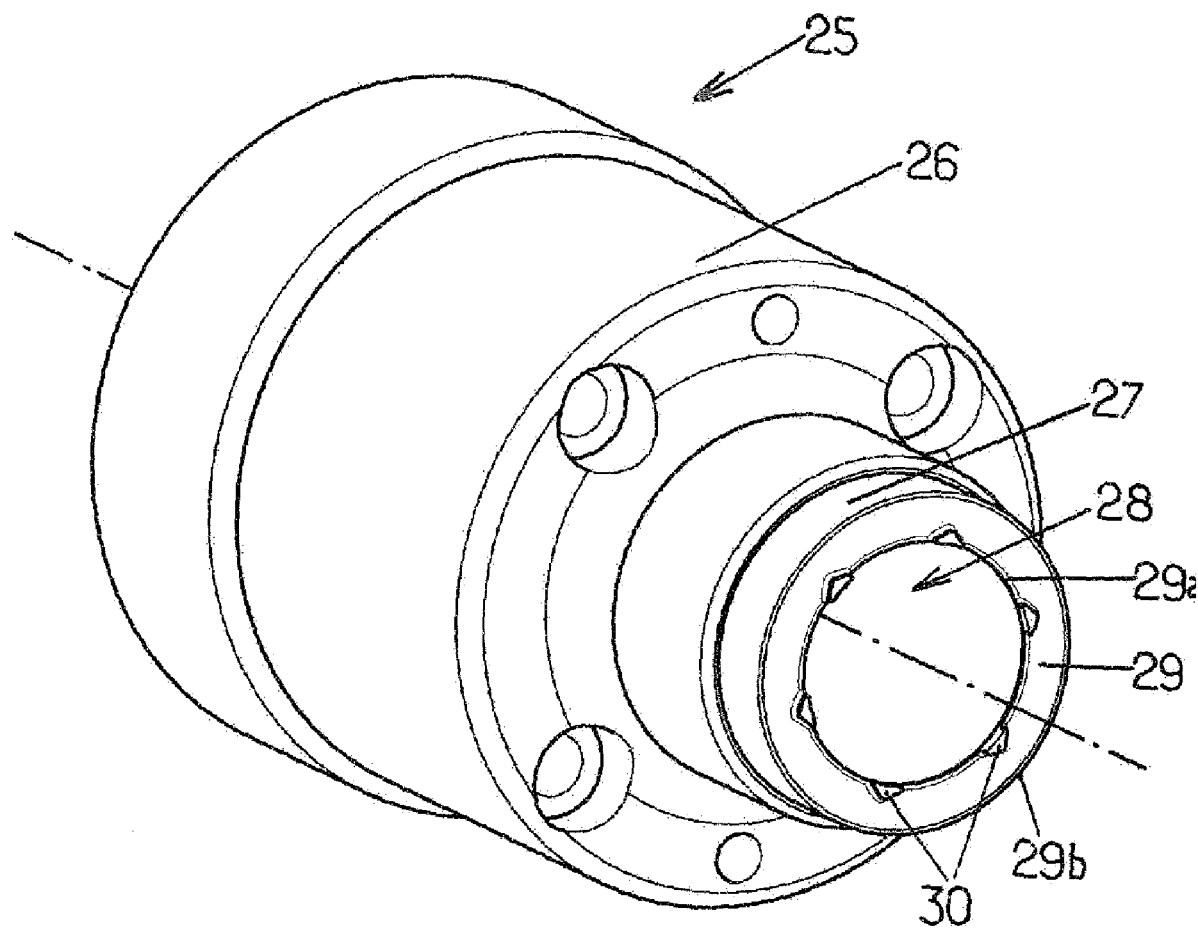
FIG. 7 is a perspective view of a tool used in a machine during assembly of the height adjustment mechanism of FIG. 2, FIGS. 8, 9, 10 and 11 are cross-sectional schematic representations, in the direction referenced VI-VI in FIG. 5, of steps in the realization of the detail represented in FIG. 3 of the height adjustment mechanism.

FIG. 7 represents a tool 25 which can be used in a machine for implementing the assembly previously described. Aside from the tool 25, the machine particularly comprises at least one holder 35 and a guiding system.

In the embodiment represented, the tool comprises a body 26 for example generally cylindrical revolving around an axis. At one end, the body 26 comprises a sleeve 27 delimiting a cylindrical housing along the axis of the body and having an opening 28 to the exterior. The housing has a suitable diameter and depth for receiving one of the free portions of the tube 10, for example the second portion 10b in FIGS. 10 and 11.

The sleeve 27 extends to a free end having a radial end surface which surrounds the opening 28. The end surface 29 is annular and has an inside edge 29a in proximity to the axis, and an outside edge 29b. The tool 25 locally comprises protrusions 30 extending along the axis of the housing from the end surface.

The protrusions 30 are intended to form the indentations 20 in the second bead 13 during the deformation of the tube 10 as explained below. The shape, number, and placement of the protrusions 30 therefore determine the shape, number, and placement of the indentations 20.

In the embodiment represented, to make six uniformly spaced indentations of a generally triangular shape formed in the second fold 18 and at a distance from the free edge of the second bead 13, six uniformly spaced protrusions 30 of a generally triangular shape are arranged on the inside edge 29a and at a distance from the outside edge 29b of the end surface 29.

As was indicated previously in relation to the indentations 20, the invention is not limited in the shape, number, and placement of the protrusions 30, as the number of protrusions 30 can for example be another sub-multiple of the number of notches 4 than the one previously described, in particular having one protrusion 30 for every three notches 4, or the number of protrusions 30 can be equal to the number of notches 4. There can also be an irregular allocation of the protrusions 30 or one single protrusion 30.

The holder 35 can be identical to the tool 25 previously described or similar to it, in particular without any protrusions as illustrated in FIGS. 8 to 11. In particular, the holder 35 can comprise a cylindrical housing along one axis, open to the exterior and adapted to receive one of the first 10a and second 10b free portions of the tube.

The tool 25 and the holder 35 can be mounted interchangeably in the guiding system. The tool 25 and the holder 35 are then positioned facing and at a distance from each other, with their housings coaxial. The guiding system can comprise an activating device, for example hydraulic or pneumatic, which allows moving the tool 25 and the holder 35 towards each other in a direction parallel to the axes of the housings. A positioning device can be provided, as will become clear in the description which follows, for positioning the protrusions 30 to face the notches 4 during assembly of the tube 10 and link 2.

An assembly process which can be implemented by the machine described above is described in relation to FIGS. 8 to 11.

In FIGS. 8 and 9, one of the axial stops is formed on the tube 10 in the form of the first bead 11.

To do this, in the embodiment represented, the first 10a and second 10b free portions of the tube are respectively filled into first 35a and second 35b holders analogous to the one previously described. The housing for each holder 35a, 35b has an inner annular shoulder pressing against the end of one of the first 10a and second 10b free portions of the tube 10. The radial end surfaces 36a, 36b of the holders 35a, 35b are placed facing each other, leaving an expansion space between them into which a part of the tube 10 extends.

The first 35a and second 35b holders 35a, 35b, arranged coaxially to each other and coaxially to the axis of the tube 10, are moved closer to each other so as to compress the tube 10 and cause radial deformation of the tube 10 into the expansion space. To ensure that the radial deformation occurs outwardly, a guiding element 37 can be placed inside the tube 10.

As the tube 10 is compressed by the advancing holders 35a, 35b, the part of the tube in the expansion space bulges then is flattened to form the first bead 11 with the first 15 and second 16 portions in contact with each other, and the first 17 and second 18 folds (FIG. 9).

Figure 10:
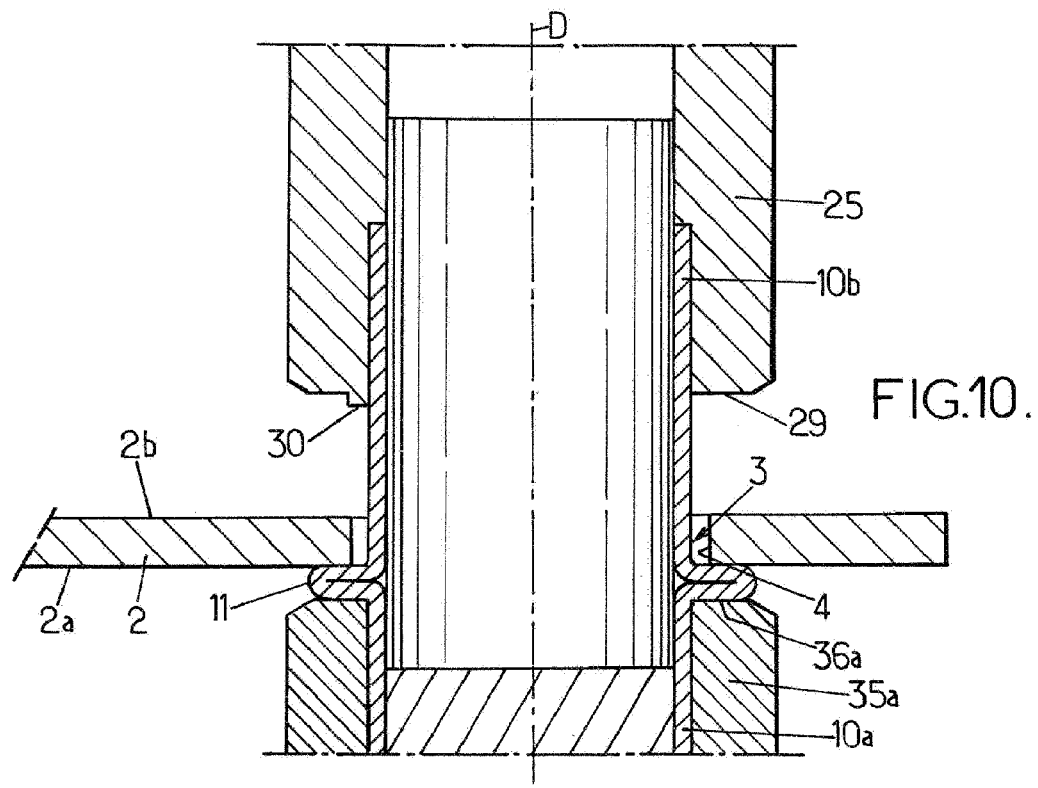

In FIG. 10, the tube 10 is positioned coaxially in the bore 3 of the link until the stop surface of the first bead 11 is in contact with the first lateral surface 2a of the link.

The first 10a and second 10b free portions of the tube 10 are maintained in the first holder 35a and the tool 25 respectively. The end surface 36a of the first holder 35a is placed in contact with the support surface of the first bead 11. As previously described, the end surface 29 of the tool 25 is at a distance from the second lateral surface 2b of the link, opposite the first holder 35a, leaving an expansion space. An annular shoulder inside the housing of the tool 25 is in contact with the end of the second free portion 10b of the tube.

Figure 11:
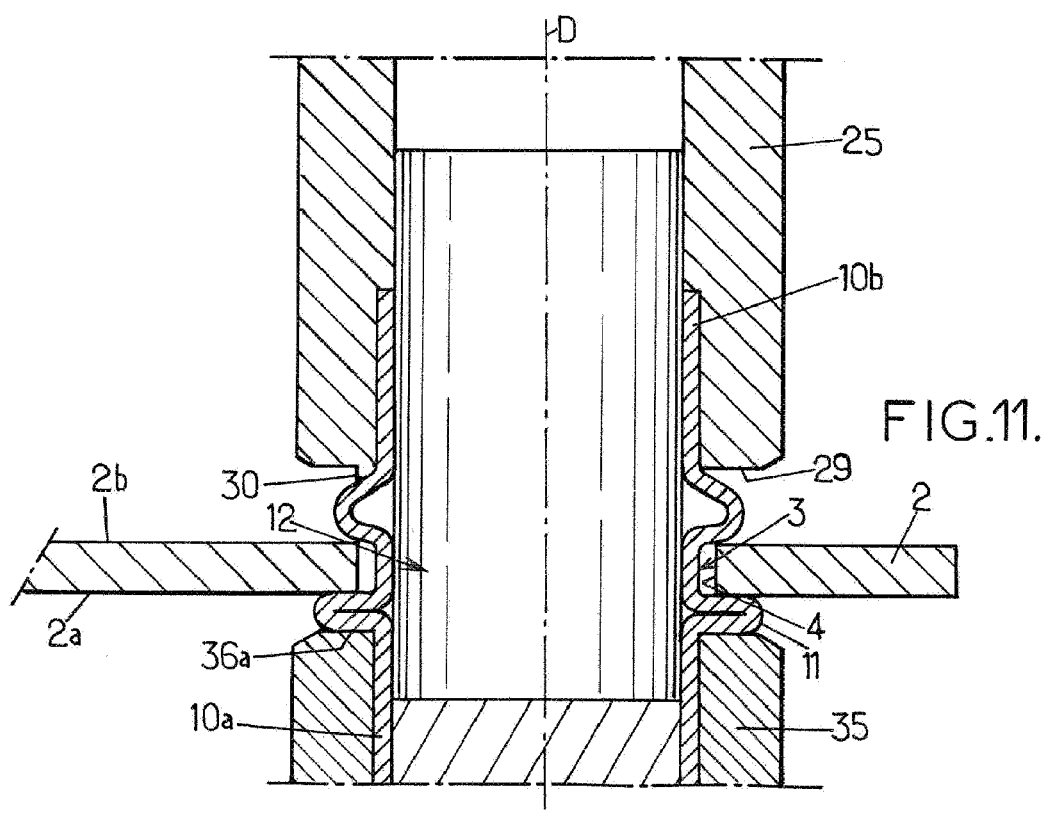

In FIG. 11, the tube 10 is radially deformed outward, by compressing the tube 10 along its axis. The part of the tube 10 in the expansion space bulges and assumes a domed shape which bulges outward due to the presence of the guiding element 37 inside the tube 10.

This domed part, visible in FIG. 11, is then flattened to form the second bead 13 in FIG. 6, with the first 15 and second 16 portions in contact with each other and the first 17 and second 18 folds, the stop surface of the second bead 13 coming into contact with the second lateral surface 2b of the link.

The compression of the tube 10 causes an outward flow of the material of the fitting portion 12. The fitting portion 12 then deforms such that the fitting portion 12 locally comes into contact with the contact sections 5 of the bore 3, and bulges 19 form facing the notches 4 in order to extend into the notches 4. In addition, during the deformation of the fitting portion 12, the support surface of the second bead 13 is axially indented in the second fold 18 and at a distance from the free edge, by means of the protrusions 30 of the tool 25 positioned facing six of the notches 4. The indentations 20 are formed in this manner in the support surface of the second bead 13. The pressing of the protrusions 30 against the support surface displaces some of the material of the second bead 13 towards the fitting portion 12 and radially increases the outward flow of the material into the corresponding notches 4. The bulges 19 adjacent to the indentations 20 thus penetrate more deeply into the notches 4.

In one variation, as indicated above, in order to create indentations in the support surface of the first bead 11, the holder 35a intended to press against the second portion 16 of the first bead 11 can be replaced by a tool 25 equipped with protrusions 30.

To manufacture the seat described above, the assembly process is repeated for the four links 2, then the ends of the tubes 10 are pivotably mounted onto the flanges of the seat part 6.

The invention claimed is:

1. A vehicle seat comprising a seat part equipped with a rigid frame, and a height adjustment mechanism comprising:
at least one link intended to be pivotably mounted relative to a floor of the vehicle, with said link having two substantially parallel lateral surfaces, and a bore extending between said lateral surfaces, said bore being delimited by an internal cylindrical surface of a generally circular cross-section, along an axis substantially perpendicular to said lateral surfaces, with said bore comprising at least one substantially radial notch,
a revolving tube pivotably mounted on the rigid frame, said tube extending along the axis and having a fitting portion placed in the bore, said tube externally comprising two axial stops which delimit between them the fitting portion and which are respectively in contact with the lateral surfaces of the link, at least one of said axial stops consisting of a radial deformation of the tube to form a bead, said bead having a stop surface and a support surface opposite the stop surface, said stop surface being in contact with one of the lateral surfaces, the fitting portion externally comprising at least one locally formed radial deformation facing the notch and forming a bulge, said bulge extending into the notch,
wherein the bead comprises at least one axial indentation in the support surface, facing the notch, said indentation being adjacent to the bulge, said indentation being a sunk relief in the support surface and causing material of the bead to be displaced towards the fitting portion to increase the amount of material of the tube extending into the notch.

2. A seat according to claim 1, wherein the stop surface and the support surface of the bead are respectively connected to the tube by first and second folds, with the bead extending out to a free edge, and the indentation being formed in the second fold and at a distance from the free edge.

3. A seat according to either of claim 1, wherein the link comprises a number, greater than or equal to 2, of uniformly spaced notches, and the bead comprises a number, greater than or equal to 2, of uniformly spaced indentations.

4. A seat according to claim 3, wherein the number of indentations is a sub-multiple of the number of notches.

5. A seat according to claim 3, wherein the number of indentations is equal to the number of notches, one indentation being provided facing each notch.

* * * * *